Sept. 6, 1938.   E. G. GARTIN   2,128,934
ROCK DRILL
Filed July 31, 1934   2 Sheets-Sheet 1
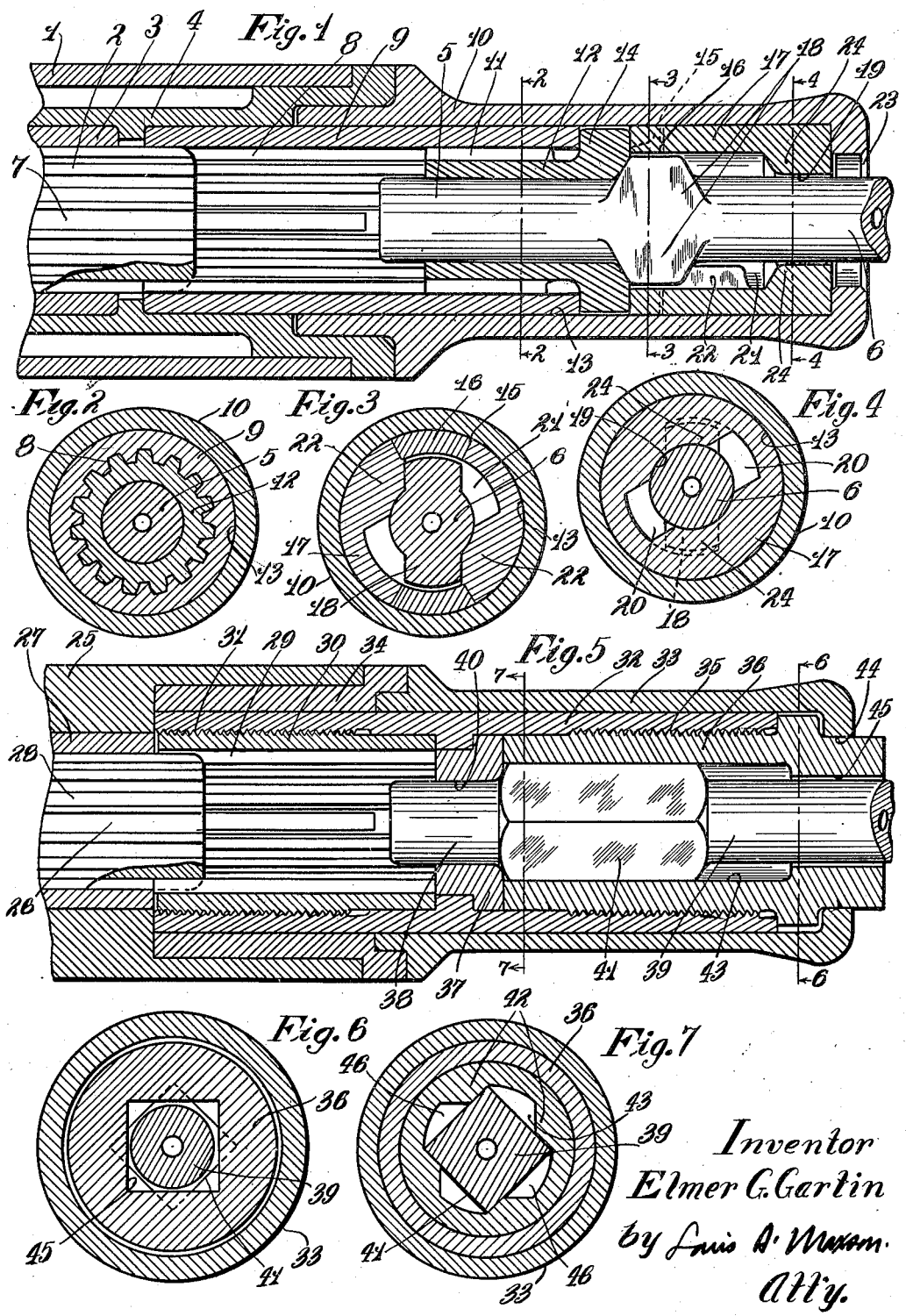
Inventor
Elmer G. Gartin
by [signature]
Atty.

Sept. 6, 1938.  E. G. GARTIN  2,128,934
ROCK DRILL
Filed July 31, 1934  2 Sheets-Sheet 2
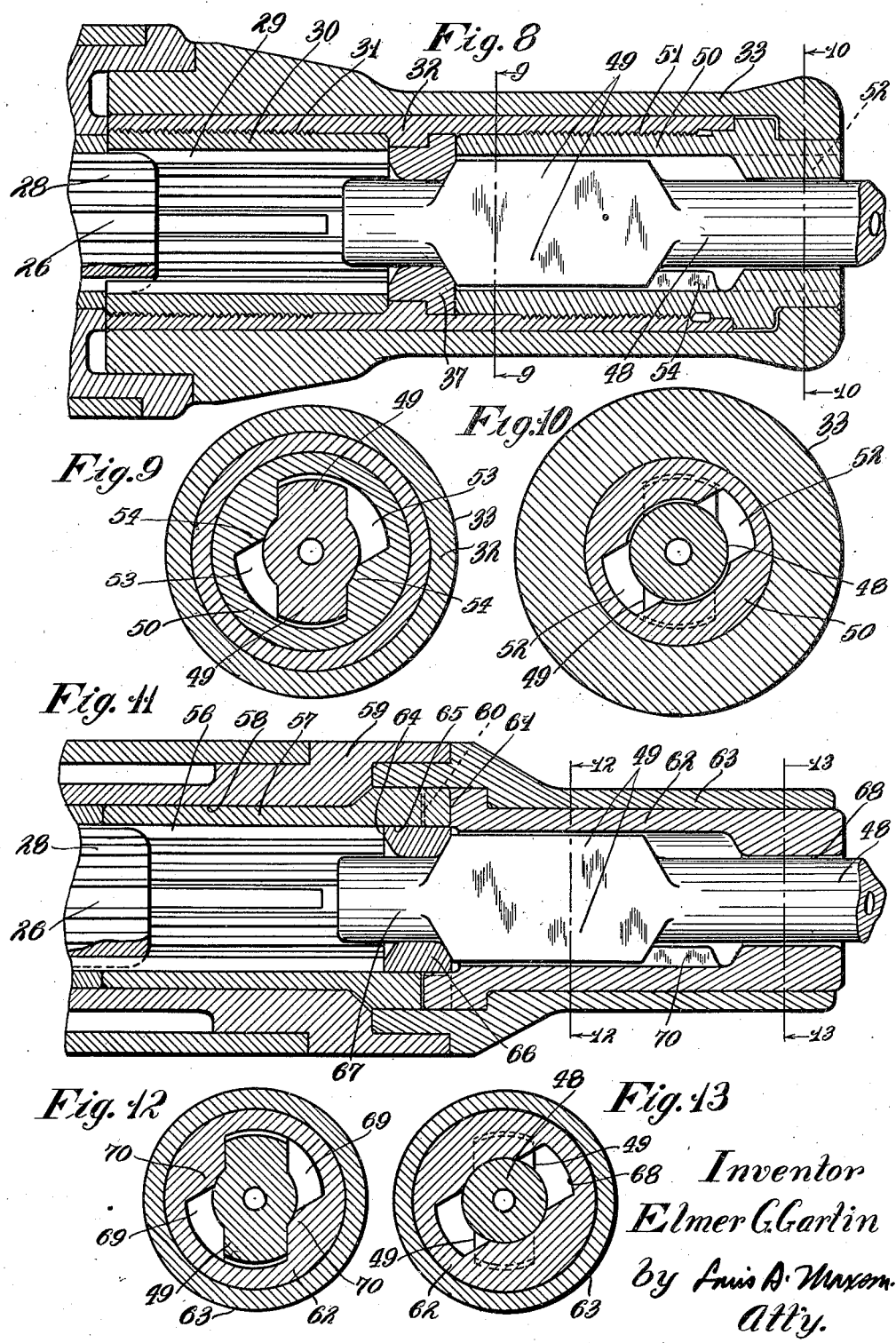

Patented Sept. 6, 1938

2,128,934

UNITED STATES PATENT OFFICE 2,128,934

ROCK DRILL

Elmer G. Gartin, Claremont, N. H., assignor to Sullivan Machinery Company, a corporation of Massachusetts Application July 31, 1934, Serial No. 737,795

14 Claims. (Cl. 121—32)

This invention relates to rock drills, and more particularly to improvements in the drill steel chuck mechanism for such drills.

An object of this invention is to provide an improved rock drill chuck mechanism. Another object is to provide an improved drill steel chuck mechanism having improved means for supporting and driving the drill steel and for locking the drill steel within the chuck. These and other objects of the invention will, however, hereinafter more fully appear.

In the accompanying drawings there are shown for purposes of illustration several forms which the invention may assume in practice.

In these drawings—

Fig. 1 is a longitudinal section through the forward portion of a rock drill within which one illustrative form of the improved chuck mechanism is embodied.

Fig. 2 is a cross sectional view taken on line 2—2 of Fig. 1.

Fig. 3 is a cross sectional view taken on line 3—3 of Fig. 1.

Fig. 4 is a cross sectional view taken on line 4—4 of Fig. 1.

Fig. 5 is a view similar to Fig. 1 showing a modified form of the invention.

Fig. 6 is a cross sectional view taken on line 6—6 of Fig. 5.

Fig. 7 is a cross sectional view taken on line 7—7 of Fig. 5.

Fig. 8 is a view similar to Fig. 1 showing still another form of the invention.

Fig. 9 is a cross sectional view taken on line 9—9 of Fig. 8.

Fig. 10 is a cross sectional view taken on line 10—10 of Fig. 8.

Fig. 11 is a view similar to Fig. 8 showing still another form of the invention.

Fig. 12 is a cross sectional view taken on line 12—12 of Fig. 11.

Fig. 13 is a cross sectional view taken on line 13—13 of Fig. 11.

In the illustrative embodiment of the invention shown in Figs. 1 to 4, inclusive, the improved chuck mechanism is embodied in a hammer type rock drill comprising a cylinder 1 containing a reciprocable hammer piston having a striking bar 2 slidably guided in a bushing 3 supported within a front head 4, and this striking bar is adapted to deliver impact blows to the shank 5 of a drill steel 6. As is usual in rock drills, the hammer piston is rotated as it is reciprocated, and this rotative piston movement is transmitted to the drill steel so that as the latter is percussively actuated, it is at the same time rotated. The piston striking bar 2 is provided with longitudinal grooves 7 interlocked with straight lugs or vanes 8 formed internally within a chuck sleeve 9 rotatably mounted in alined bores formed in the front motor head 4 and a front chuck housing 10. These straight lugs or vanes 8 extend throughout the entire length of the chuck sleeve 9 and the latter is of uniform dimensions throughout its length, as clearly shown in Fig. 1. Interlocked with the straight lugs or vanes within the forward portion of the chuck sleeve 9 is a chuck member 12 having longitudinal grooves on its exterior periphery with which the chuck sleeve engages. This chuck member has a bore which receives and supports the drill steel shank 5 and has an enlarged forward portion 14 of cylindrical form having clutch jaws 15 interlocked with clutch teeth 16 formed on a driver member 17 rotatably mounted in the chuck housing bore. The drill steel 6 is of the usual lugged type having lateral locking and driving lugs 18 and is adapted to be locked within and driven by the driver member, as will later be described.

The driver member 17 is provided with a bore 19 in alinement with the chuck member bore, but of different contour, and this bore at its foremost portion is provided with two enlargements 20, 20 to permit the insertion therethrough of the lugs 18 of the drill steel. Rearwardly of the forward end of the driver member an enlarged chamber 21 is provided, this chamber having a bore of the shape which would be produced by the partial revolution of a lug similar in shape to the opening of the front end of the member 17, thus leaving within the bore a pair of inwardly directed lugs 22, 22 against which the lugs 18 of the drill steel are engageable during steel rotation. The forward end of the chuck housing is provided with a central opening 23 to permit insertion of the drill steel shank through the forward portion of the chuck housing and within the "key opening" 19, 20 in the driver member into driving and locking position within the driver member. Upon insertion of the drill steel shank through the opening 19 at the front end of the driver member and partial rotation of the drill steel with respect thereto, the drill steel is locked in the chuck with the lugs thereon lying behind the locking portions 24 of the driver member. It will thus be seen that the chuck member and the piston striking bar are of identical cross section at their periphery so that they both interlock within the common lugged opening within the chuck sleeve 9, and as the piston striking bar is rotated during piston reciprocation, rotation is transmitted to the chuck sleeve, through the chuck sleeve to the chuck member 12 and through the member 12 to the driver member 17 which engages and drives the drill steel 6.

In the modified form of the invention shown in Figs. 5, 6 and 7, the improved chuck mechanism is shown associated with a rock drill comprising a cylinder 25 containing a reciprocable hammer piston having a forwardly projecting striking bar 26 guided in a guide bushing 27 carried within the forward end of the cylinder. This piston striking bar is provided with longitudinal grooves 28 which are interlocked with longitudinal lugs or vanes 29 formed internally within a sleeve-like chuck nut 30 threaded at 31 within a chuck sleeve 32 rotatably mounted within bores formed in a front chuck housing 33 and a sleeve-like member 34. Threadedly secured at 35 within the forward portion of the chuck sleeve is a chuck member 36, and arranged within the bores of the chuck sleeve between the forward surface of the chuck nut in engagement with the forward ends of the lugs and the rear surface of the chuck member 36 is a replaceable wear bushing 37. The piston striking bar is adapted to deliver impact blows to a reduced cylindrical portion 38 of the drill steel shank 39, and this reduced cylindrical portion is guided in the bore 40 formed in the wear bushing 37 in the manner shown in Fig. 5. The drill steel shank is provided with an elongated driving portion, herein preferably of square cross section at 41 to provide large wearing surfaces, and these surfaces are engageable with similarly elongated drive lugs 42 formed internally within a bore 43 within the chuck member 36. The forward portion of the chuck member fits within a bore 44 formed within the chuck housing 33, and is provided with an opening 45 of square cross section for receiving the square driving portion 41 of the steel shank. When the steel shank is inserted within the chuck member, the square portion 41 thereon is passed through the square key opening 45, and as the steel shank is shoved rearwardly into the position shown in Fig. 5, the corner edges of the square portion 41 thereof enter longitudinal grooves 46 coextensive with the driving lugs 42. When the drill steel shank is in this position, it is rotated to bring the corners of the square portion 41 against the driving lugs 42 and at the same time bring the squared portion 41 out of registry with the square opening 45, thereby to lock the steel shank within the chuck member, in the manner shown in Fig. 6. As the piston striking bar 26 is reciprocated, it is at the same time rotated, and this rotative movement is transmitted through the chuck nut 30, chuck sleeve 32 and chuck member 36 to the driving portion 41 of the drill steel shank so that as the drill steel is percussively actuated, it is at the same time rotated. When the wearing bushing 37 becomes worn, it may be readily replaced.

In the modified form of the invention shown in Figs. 8, 9 and 10, the structure of the chuck mechanism is similar to that shown in Fig. 5, and as in the form shown in Fig. 5, the piston striking bar 26 has longitudinal grooves 28 interlocked with straight lugs 29 formed on a chuck nut 30 threaded within a chuck sleeve 32; and the associated rock drill structure is also similar to that shown in Fig. 5. However, in this form of the invention the drill steel shank 48 is provided with elongated driving lugs 49 and the shank portion of the drill steel is the same in cross section as in the form of the invention shown in Fig. 1, although in this instance the drive lugs of the steel are of substantially greater length, thereby to provide large wearing surfaces on the steel. A chuck member 50 is threaded at 51 within the forward portion of the chuck sleeve 32 and is provided with a key opening 52 for receiving the lugs 49 of the steel shank, and as the steel shank is moved inwardly into the position shown in Fig. 8, the lugs 49 enter longitudinal recesses 53, 53 formed in the chuck member 50. Also formed within the chuck member 50 are inwardly directed lugs 54 with which the lugs of the steel shank are engageable when the steel is rotated relative to the chuck member into its locked position with the lugs thereof out of registry with the key opening 52 in the manner shown in Fig. 10. Otherwise this form of the invention is the same as those above described.

In the modified form of the invention shown in Figs. 11, 12 and 13, the rock drill and drill steel are similar to those shown in Fig. 8, but in this instance, there is a material change in the rotation elements of the chuck. In this instance, the piston striking bar 26 has longitudinal grooves 28 interlocked with the straight lugs 56 formed internally within a chuck sleeve 57 rotatably mounted in a bore 58 formed in a front head member 59. The forward portion of the member 57 is, at its forward end, enlarged in cross section, and is provided with clutch jaws 60 interlocked with clutch teeth 61 formed on a locking and driving sleeve 62 rotatably mounted within a bore formed in a front chuck housing 63. Arranged between the rear surface of the member 62 and abutting at 64 the forward ends of the lugs 56 and having its rearward portion disposed in a bore 65 in the member 57, is a wearing bushing 66 in the bore of which the reduced portion 67 of the steel shank is guided. The forward portion of the sleeve 62 is provided with a key opening 68 similar to the key opening 52 in the form of the invention shown in Fig. 8, and the steel shank lugs 49 enter longitudinal grooves 69 and engage inwardly directed lugs 70 exactly in the manner disclosed in Fig. 8. The steel shank is inserted within the key opening 68 and thereafter is rotated into its locked position, as shown in Fig. 13, with the driving lugs 49 thereon engaging the lugs 70 on the driving sleeve 62. As the piston striking bar is reciprocated, it delivers impact blows to the reduced end of the steel shank, and the rotative movement of the striking bar is transmitted through the chuck sleeve 57, the clutch 60, 61 and sleeve 62 to the lugs of the drill steel shank. It will be evident that when the wear bushing 66 becomes worn, it may be readily replaced as in the forms of the invention above described.

As a result of this invention, it will be noted that four forms of chuck mechanism are disclosed wherein the drill steel is supported and locked within and driven by the chuck in an improved manner. It will further be noted that large wearing surfaces are provided in three forms of the invention and that the guided portion of the steel shank is supported within a replaceable wear bushing. In two forms of the invention the rotative movement of the hammer piston is transmitted to the steel driver member in an improved manner, and in one form the steel chuck member and the piston striking bar are of the same peripheral cross section and are interlocked within a common lugged bore within the chuck sleeve. These and other uses and advantages of the improved chuck mechanism will be clearly apparent to those skilled in the art.

While there are in this application specifically described several forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a rock drill chuck mechanism, the combination with a drill steel having a shank, of steel rotating means including a chuck member having a bore, a driver member for receiving and driving the drill steel, and a replaceable wear bushing separable from said chuck and driver members for receiving and guiding the rearward portion of the drill steel shank and slidably seated in said chuck member bore, said bushing having a portion secured between the adjacent ends of said chuck and driver members and said bushing having a sliding fit within said chuck member bore and releasable therefrom by a rectilinear axial movement.

2. In a rock drill chuck mechanism, the combination with a drill steel, of a rotating chuck sleeve, a driver member rotated by said chuck sleeve and receiving the drill steel shank, and a replaceable member separable from said sleeve and driver member for receiving and guiding the rearward portion of the steel shank and having a portion arranged between the adjacent ends of said sleeve and said driver member, said replaceable member having a reduced body received in the chuck sleeve bore.

3. In a rock drill chuck mechanism, a drill steel actuator having reciprocatory and rotary movements, a sleeve of uniform dimensions throughout its length and having a uniform axial bore therethrough, said actuator projecting within said sleeve bore and interlocked therewith, said sleeve rotatable with said actuator, a chuck member for receiving the shank of a drill steel and having a portion of the same peripheral cross section and of the same external diameter as said steel actuator, said chuck member projecting within the sleeve bore and interlocked therewith, said sleeve bore common to both the steel actuator and chuck member and having common interlocking connections therewith, and a steel driver member clutched to said chuck member for receiving and locking the steel shank.

4. In a rock drill chuck mechanism, a driving element, a chuck sleeve having a uniform bore throughout its length for receiving a portion of said driving element, and a drill steel driver member having a portion received in said chuck sleeve bore, said driving element and driver member portions being of the same peripheral cross section and both substantially fitting the chuck sleeve bore and interlocked with the chuck sleeve, said driver member adapted detachably to receive a drill steel.

5. In a rock drill chuck mechanism, a driving element, a driven element, said driven element adapted detachably to receive the shank of a drill steel, a chuck sleeve of uniform dimensions throughout its length and having an internal uniform bore of irregular cross section extending therethrough, said bore adapted to receive portions of said driving and driven elements, said portions being of similar cross section and external diameter to said sleeve bore.

6. In a rock drill chuck mechanism, the combination with a drill steel and a drill steel actuator having reciprocatory and rotary movements and provided with a splined striking portion for delivering impact blows to the drill steel shank, of a rotating chuck sleeve having a splined connection with said striking portion, the connection between the sleeve and said striking portion being in the form of teeth projecting inwardly within the sleeve bore and interlocked with said splined striking portion, a driving member for receiving and driving said drill steel and rotatable with said chuck sleeve, and a replaceable bushing separable from said sleeve and driving member for receiving and guiding the rearward portion of the drill steel shank, said bushing projecting within the chuck sleeve bore and engaging said inwardly projecting sleeve-interlocking teeth, said chuck sleeve limiting movement of said bushing in one direction and said inwardly projecting teeth connecting said bushing with said chuck sleeve, said bushing having grooves for interlockingly receiving said teeth.

7. In a rock drill chuck mechanism, the combination with a drill steel, of steel rotating means including a chuck sleeve, a driver member for receiving and driving said steel and rotatable with said chuck sleeve, and a replaceable bushing separable from said sleeve and driver member for receiving and guiding the rearward portion of the drill steel shank and having a projection secured between said sleeve and driver member.

8. In a rock drill chuck mechanism, the combination with a drill steel, of steel rotating means including a chuck sleeve, a driver member for receiving and driving said steel and rotatable with said chuck sleeve, and a replaceable bushing separable from said sleeve and driver member for receiving and guiding the rearward portion of the drill steel shank and having an enlarged flange clamped between said sleeve and driver member.

9. In a rock drill chuck mechanism, the combination with a drill steel, of steel rotating means including a chuck sleeve, a driver member for receiving and driving said steel and rotatable with said chuck sleeve, a replaceable bushing separable from said sleeve and driver member for receiving and guiding the rearward portion of the drill steel shank and having an enlarged flange clamped between said sleeve and driver member and a sleeve-like body portion received in the chuck sleeve bore.

10. In a rock drill chuck mechanism, the combination with a drill steel, of steel rotating means including a chuck sleeve, a driver member for receiving and driving said steel and rotatable with said chuck sleeve, and a replaceable bushing separable from said sleeve and driver member for receiving and guiding the rearward portion of the drill steel shank and having a front flange clamped between said sleeve and driver member and a rearwardly projecting sleeve-like body portion extending within the chuck sleeve bore.

11. In a rock drill chuck mechanism, the combination with a drill steel, of drill steel rotating means including a rotatable chuck sleeve, a driver member for receiving and driving the shank of said drill steel and rotatable with said chuck sleeve, and a replaceable bushing separable from said sleeve and driver member for receiving and guiding the rearward portion of the drill steel shank, said bushing providing a connection between said sleeve and said driver member, said bushing having a sliding interlocking connection with said chuck sleeve and an interlocking connection with said driver member.

12. In a rock drill chuck mechanism, a rotatable chuck sleeve, a driver member for receiving and driving the shank of a drill steel, and a replaceable bushing separable from said sleeve and driver member for receiving and guiding the rearward portion of the drill steel shank and having a portion slidingly interlocked with said chuck sleeve and another portion slidingly interlocked with said driver member, said interlocking connections between said chuck sleeve and driver member and said portions of said bushing positively locking said driver member for rotation with said sleeve.

13. In a rock drill chuck mechanism, the combination with a lugged drill steel and a drill steel actuator having reciprocatory and rotary movements and provided with a splined striking portion for delivering impact blows to the drill steel shank, of a rotating driver member having an opening for receiving the drill steel shank and integral driving lugs engageable with the lugs on the drill steel and having means cooperating with the steel lugs for locking the steel shank therein while permitting reciprocatory movement of the drill steel relative thereto, a chuck member connected to said steel driving and locking member for rotation therewith and having a toothed interlocking connection with the teeth of said splined striking portion, said interlocking connection including inwardly projecting teeth within the bore of said chuck member engaging the splines of said striking portion, and a replaceable wear bushing separable from said members and mounted for rotation with said members for receiving the shank of the drill steel, said wear bushing having a portion engaging said interlocking teeth and said bushing having a portion arranged between a forwardly facing surface on said chuck member and the rear end surface of said driver member.

14. In a rock drill chuck mechanism, the combination with a drill steel having a shank, of steel rotating means including a chuck member having a bore, a driver member for receiving and driving the drill steel and a replaceable wear bushing separable from said chuck and driver members for receiving and guiding the rearward portion of the drill steel shank and slidably seated in said chuck member bore, said bushing providing a driving connection between said chuck and driver members and having a portion secured between said chuck and driver members, said bushing having a sliding fit within said chuck member bore and releasable therefrom by a rectilinear axial movement.

ELMER G. GARTIN.